US012802882B2

(12) United States Patent
Namiki et al.

(10) Patent No.: US 12,802,882 B2
(45) Date of Patent: Nov. 17, 2026

(54) DIELECTRIC AND MULTILAYER ELECTRONIC DEVICE

(71) Applicant: TDK CORPORATION, Tokyo (JP)

(72) Inventors: Ryota Namiki, Tokyo (JP); Toshihiro Iguchi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 225 days.

(21) Appl. No.: 18/756,548

(22) Filed: Jun. 27, 2024

(65) Prior Publication Data

US 2025/0037936 A1 Jan. 30, 2025

(30) Foreign Application Priority Data

Jul. 26, 2023 (JP) ................................ 2023-121597

(51) Int. Cl.
*H01G 4/30* (2006.01)
*H01G 4/12* (2006.01)
*H01G 4/236* (2006.01)

(52) U.S. Cl.
CPC ........... *H01G 4/1227* (2013.01); *H01G 4/236* (2013.01); *H01G 4/30* (2013.01)

(58) Field of Classification Search
None
See application file for complete search history.

(56) References Cited

U.S. PATENT DOCUMENTS

| | | | | |
|---|---|---|---|---|
| 6,329,311 | B1 * | 12/2001 | Fujii | H01G 4/1227 361/321.5 |
| 10,468,188 | B2 * | 11/2019 | Tomizawa | H01G 4/2325 |
| 10,658,115 | B1 * | 5/2020 | Ryoo | H01G 4/12 |
| 2004/0179326 | A1 | 9/2004 | Hattori | |
| 2008/0266751 | A1 * | 10/2008 | Yamazaki | C04B 35/62815 361/321.4 |
| 2019/0348222 | A1 * | 11/2019 | Kato | H01G 4/1227 |
| 2020/0090869 | A1 * | 3/2020 | Iguchi | H01B 3/12 |
| 2020/0168397 | A1 * | 5/2020 | Ryoo | H01G 4/30 |
| 2020/0251622 | A1 * | 8/2020 | Eisert | C04B 35/584 |
| 2020/0258689 | A1 * | 8/2020 | Kato | H01G 4/012 |
| 2022/0380257 | A1 * | 12/2022 | Iguchi | C04B 35/4682 |
| 2023/0386745 | A1 * | 11/2023 | Sueda | H01G 4/12 |

FOREIGN PATENT DOCUMENTS

JP 2004-273975 A 9/2004

* cited by examiner

*Primary Examiner* — Timothy J. Dole
*Assistant Examiner* — Esther N Lian
(74) *Attorney, Agent, or Firm* — Oliff PLC

(57) ABSTRACT

A dielectric includes a dielectric grain, a segregate, and a pore. The segregate and the pore are in contact to form a specific combination in a section of the dielectric. A multilayer electronic device includes a dielectric including a dielectric grain, a segregate, and a pore. The segregate and the pore are in contact to form a specific combination in a section of the dielectric.

19 Claims, 4 Drawing Sheets

DIELECTRIC AND MULTILAYER ELECTRONIC DEVICE

TECHNICAL FIELD

The present invention relates to a dielectric and a multilayer electronic device.

BACKGROUND

Patent Document 1 discloses an invention related to a monolithic ceramic capacitor. A sintering additive containing Si is deposited in spaces of internal conductors of the monolithic ceramic capacitor.

Patent Document 1: JP Patent Application Laid Open No. 2004-273975

SUMMARY

The present invention provides a dielectric in which cracks or chips are less readily generated and a multilayer electronic device including the dielectric.

To achieve the above object, a dielectric according to the present invention includes a dielectric grain, a segregate, and a pore, wherein the segregate and the pore are in contact to form a specific combination in a section of the dielectric.

The pore of the specific combination may have a size smaller than that of the segregate of the specific combination.

An average size of the segregate divided by an average size of the pore may be more than 1.00 and 6.00 or less.

A number ratio of the specific combination in the section of the dielectric may be $2.0\times10^4$ or more and $5.0\times10^6$ or less per $mm^2$.

The segregate may have a linear expansion coefficient smaller than that of the dielectric grain.

An element that the segregate includes the most in terms of atomicity other than O, Ca, Sr, Zr, and Ti may be Si.

The dielectric grain may have a grain size of 0.10 μm or more and 3.00 μm or less.

The dielectric grain may include a component represented by a composition formula $[(Ca_xSr_{1-x})O]_n[(Ti_yZr_{1-y})O_2]$.

The dielectric grain may include barium titanate.

A multilayer electronic device according to the present invention includes the dielectric.

BRIEF DESCRIPTION OF THE DRAWING(S)

DETAILED DESCRIPTION

Figure 1:
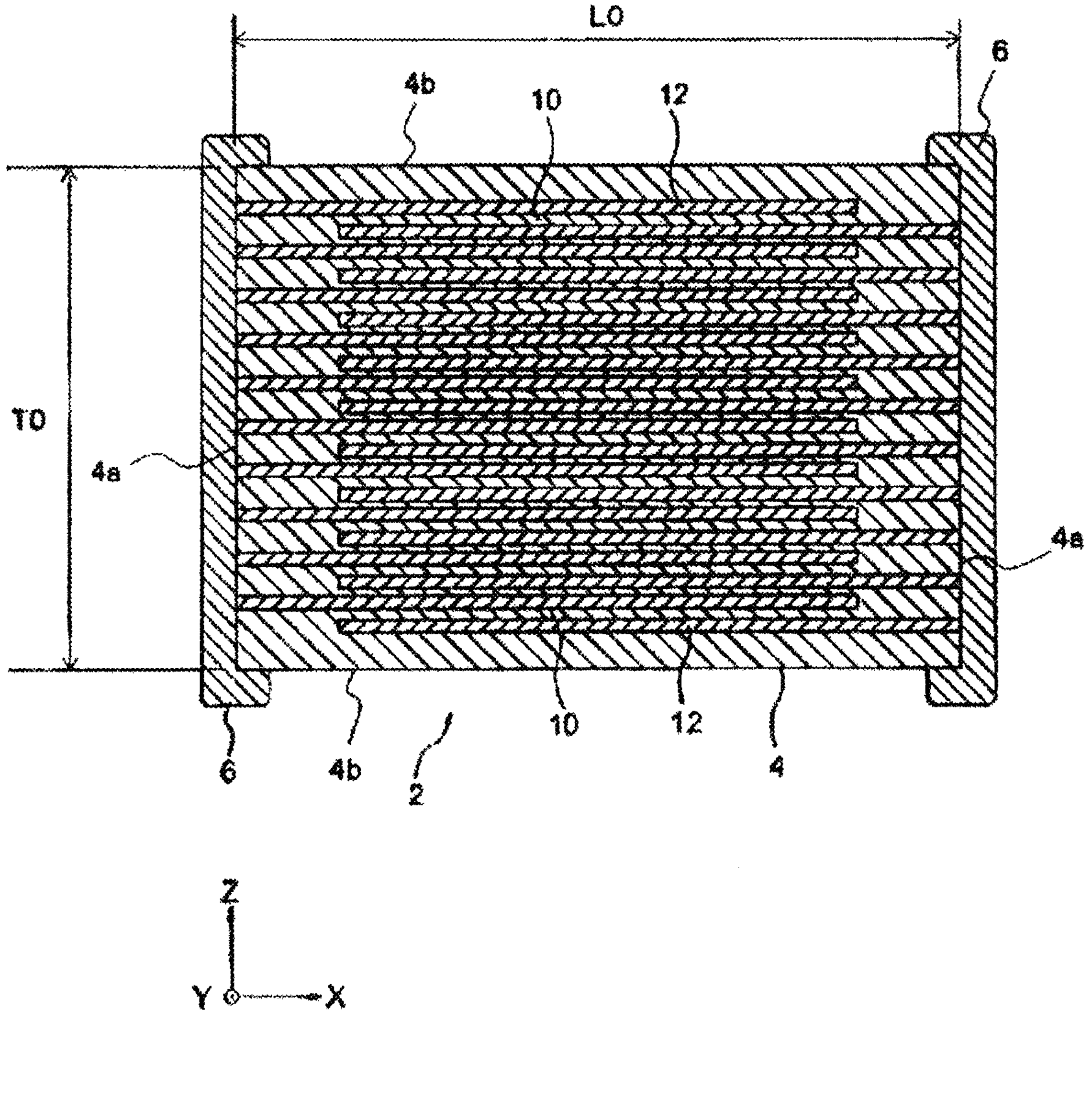
FIG. 1 is a sectional schematic view of a multilayer ceramic capacitor.

In the present embodiment, a multilayer ceramic capacitor 2 shown in FIG. 1 is described as an example multilayer electronic device according to the present invention. The multilayer ceramic capacitor 2 includes an element body 4 and a pair of external electrodes 6 formed on outer surfaces of the element body 4.

The element body 4 shown in FIG. 1 normally has a substantially rectangular parallelepiped shape and includes two end surfaces 4*a* facing each other in the X-axis direction, two side surfaces 4*b* facing each other in the Y-axis direction, and two side surfaces 4*b* facing each other in the Z-axis direction. The element body 4 may have any external dimensions. The element body 4 may have, for example, a length L0 of 0.4 mm to 5.7 mm in the X-axis direction, a width W0 of 0.2 mm to 5.0 mm in the Y-axis direction, and a height T0 of 0.2 mm to 3.0 mm in the Z-axis direction. In the present embodiment, the X-axis, the Y-axis, and the Z-axis are mutually perpendicular.

The element body 4 includes ceramic layers 10 and internal electrode layers 12, both of which are substantially parallel to a plane containing the X-axis and the Y-axis. Inside the element body 4, the ceramic layers 10 and the internal electrode layers 12 are alternately laminated along the Z-axis direction. In this context, "substantially parallel" means that the ceramic layers 10 and the internal electrode layers 12 are mostly parallel to the plane but may partly be slightly nonparallel. The ceramic layers 10 and the internal electrode layers 12 may slightly be uneven or inclined.

The element body 4 may have any shape. The shape may be, for example, an elliptical columnar shape, a cylindrical shape, or a prismatic shape, other than the substantially rectangular parallelepiped shape shown in FIG. 1.

The ceramic layers 10 are made from a dielectric described later. The ceramic layers 10 may each have any average thickness (interlayer thickness). The average thickness of each ceramic layer 10 may be 100 μm or less or may be 30 μm or less. The number of the ceramic layers 10 is not limited. The number of the ceramic layers 10 is determined according to desired properties. The number of the ceramic layers 10 may be twenty or more or may be fifty or more.

The internal electrode layers 12 are laminated between the ceramic layers 10. That is, the number of the internal electrode layers 12 is determined according to the number of the ceramic layers 10. The internal electrode layers 12 may each have any average thickness. The average thickness of each internal electrode layer 12 may be 3.0 μm or less.

The average thickness of each ceramic layer 10 is calculated by observing a section shown in FIG. 1 using a metallurgical microscope, measuring the thickness of the ceramic layer 10 at least at five points, and averaging the measurements.

The average thickness of each internal electrode layer 12 is calculated by observing the section shown in FIG. 1 using a metallurgical microscope, measuring the thickness of the internal electrode layer 12 at least at five points, and averaging the measurements.

The internal electrode layers 12 are laminated so that their ends are exposed alternately to one and the other of the two end surfaces 4*a* facing each other in the X-axis direction of the element body 4. The external electrodes 6 are formed on these end surfaces 4*a* of the element body 4 and are electrically connected to the exposed ends of the alternately arranged internal electrode layers 12. The internal electrode layers 12 and the external electrodes 6 formed in such a manner constitute a capacitor circuit. That is, the ceramic layers 10 inside a capacitance region are interposed between the internal electrode layers 12 having different polarities, and a voltage can be applied to the ceramic layers 10.

The internal electrode layers 12 are made from a conductive material. The internal electrode layers 12 may contain Ni as a main component. The conductive material constituting the internal electrode layers 12 may be pure Ni or a Ni based alloy containing at least 85 mass % Ni. The Ni based alloy may contain, together with Ni, at least one element selected from Mn, Cu, Cr, etc. The internal electrode layers 12 may contain, as an inhibitor, grains of a perovskite-type compound having a composition similar to that of a main component of the ceramic layers 10, other than the above conductive material. The internal electrode layers 12 may contain a trace amount of non-metal components, such as S and P. The internal electrode layers 12 may contain, for example, approximately not more than 0.1 mass % non-metal components. The internal electrode layers 12 may further have voids.

If the internal electrode layers 12 include the inhibitor or have the voids or the like, the internal electrode layers 12 may partly be intermittent (i.e., the conductive material may be intermittently present).

The pair of external electrodes 6 can include, for example, a baked electrode layer, a resin electrode layer, or a plating electrode layer. The pair of external electrodes 6 may be constituted by a single electrode layer or a plurality of laminated electrode layers. The external electrodes 6 can have, for example, a three-layer structure including a baked electrode layer containing Cu, a Ni plating layer, and a Sn plating layer laminated in the order mentioned. If the external electrodes 6 have this three-layer structure, the external electrodes 6 have good solder wettability because the Sn plating layer is located on outermost surfaces of the external electrodes 6.

As shown in FIG. 1, each of the external electrodes 6 integrally includes an end surface portion formed on the corresponding end surface 4*a* of the element body 4 in the X-axis direction and extended portions formed at respective ends of the four side surfaces 4*b* of the element body 4 in the X-axis direction. That is, each of the external electrodes 6 is formed so as to extend from the corresponding end surface 4*a* to the side surfaces 4*b* of the element body 4. The external electrodes 6 are insulated from each other so as not to be in contact with each other in the X-axis direction.

The extended portions of the external electrodes 6 are not essential, and it may be that the external electrodes 6 each include only the end surface portion. Alternatively, if the multilayer ceramic capacitor 2 is to be surface-mounted on a substrate, the extended portions of the external electrodes 6 are formed at least on the side surface 4*b* facing a mounting surface of the substrate at a shortest distance and are not necessarily formed on the side surface 4*b* opposite the mounting surface.

Figure 2:
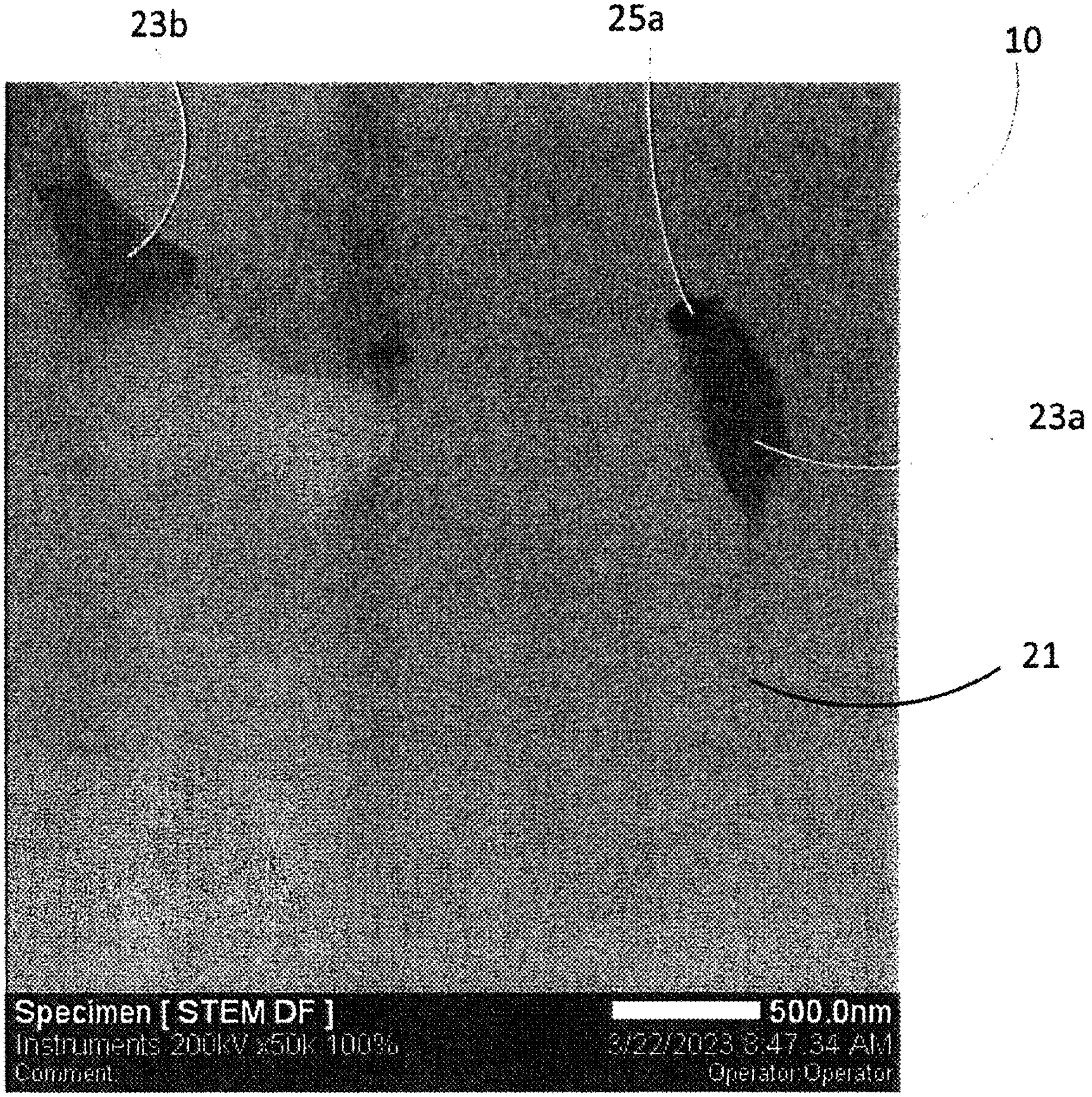
FIG. 2 is a sectional STEM-DF image of a dielectric.

FIG. 2 is a sectional photograph of the ceramic layers 10 containing the above component, i.e., the dielectric constituting the ceramic layers 10, observed with a STEM at a magnification of 50,000×. The dielectric constituting the ceramic layers 10 includes or has dielectric grains 21, segregates 23*a* and 23*b*, and pores 25*a*. The segregates 23*a* and 23*b* and the pores 25*a* are in a grain boundary between two or more dielectric grains 21. Note that, instead of a STEM, a SEM or the like may be used.

Any method of distinguishing between the dielectric grains 21, the segregates 23*a* and 23*b*, and the pores 25*a* may be used. FIG. 2 is a STEM-DF image obtained with a STEM. In the STEM-DF image, the dielectric grains 21 look the brightest, and the pores 25*a* look the darkest. The brightness of the segregates 23*a* and 23*b* seems to be in between the brightness of the dielectric grains 21 and the brightness of the pores 25*a*.

To distinguish between the dielectric grains 21, the segregates 23*a* and 23*b*, and the pores 25*a* more clearly, a mapping analysis may be performed using STEM-EDS. Using both mapping images resulting from the mapping analysis and the STEM-DF image allows a clearer distinction. According to shades of color of the mapping images, regions having a high abundance ratio of predetermined elements, i.e., regions in which the predetermined elements are segregated, can be identified. In the mapping images of the elements that the segregates 23*a* and 23*b* are relatively rich in, the segregates 23*a* and 23*b* look dull. By contrast, the pores 25*a* look pale in the mapping images of any elements. Note that STEM-WDS, SEM-EDX, or SEM-WDS may be used instead of STEM-EDS.

At least one segregate 23*a* and at least one pore 25*a* are in contact to form a specific combination in a section of the dielectric constituting the ceramic layers 10. Having the specific combination, the dielectric constituting the ceramic layers 10 readily has an improved sinterability. Further, the dielectric readily has an improved insulation resistance and an improved durability. In particular, the dielectric readily has less cracks.

The segregate 23*b* is a segregate not in contact with the pores. It may be that the segregate 23*b* is not included in the dielectric constituting the ceramic layers 10. The dielectric constituting the ceramic layers 10 may have pores (not shown in FIG. 2) that are not in contact with the segregates.

The number ratio of the specific combination in a section of the dielectric constituting the ceramic layers 10 is not limited. The number ratio may be, for example, $1.0\times10^4$ or more and $1.0\times10^8$ or less per mm$^2$, $1.2\times10^4$ or more and $3.9\times10^7$ or less per mm$^2$, or $2.0\times10^4$ or more and $5.0\times10^6$ or less per mm$^2$. With the number ratio of the specific combination being within the above range, the dielectric readily has an improved sinterability, an improved insulation resistance, and an improved durability. In particular, the dielectric readily has less cracks.

To calculate the number ratio of the specific combination, at least a total of 1,000 μm$^2$ of a section of the dielectric constituting the ceramic layers is observed. Then, the number of sets of the specific combination in the observed section is checked to calculate the number ratio of the specific combination. Note that, to observe a total of 1,000 μm$^2$ or more of the section of the dielectric, multiple fields of view may be set.

In a section of the dielectric, one segregate 23*a* may be in contact with a plurality of pores 25*a*. In this situation, the number of the pores 25*a* in contact with the one segregate 23*a* is regarded as the number of sets of the specific combination. One pore 25*a* may be in contact with a plurality of segregates 23*a*. In this situation, the number of the segregates 23*a* in contact with the one pore 25*a* is regarded as the number of sets of the specific combination.

In the specific combination, there may be approximately at least four times more segregates 23*a* in contact with the pores 25*a* at major-axial ends of the segregates 23*a* than the segregates 23*a* in contact with the pores 25*a* at minor-axial ends of the segregates 23*a*. The pore 25*a* of FIG. 2 is as well in contact with the segregate 23*a* of the specific combination at a major-axial end of the segregate 23*a*.

The dielectric grains 21 may have any grain size. The dielectric grains 21 may have a grain size of 5.00 μm or less or a grain size of 0.10 μm or more and 3.00 μm or less. The dielectric grains 21 may have any average grain size. The dielectric grains 21 may have an average grain size of 5.00 μm or less or an average grain size of 0.10 μm or more and 3.00 μm or less.

The segregates 23*a* and 23*b* may have any size. The segregates 23*a* and 23*b* may have a size of 5.00 μm or less or a size of 0.05 μm or more and 2.00 μm or less. The segregates 23*a* and 23*b* may have any average size. The segregates 23*a* and 23*b* may have an average size of 4.00 μm or less or an average size of 0.04 μm or more and 1.50 μm or less.

The pores 25*a* may have any size. The pores 25*a* may have a size of 1.50 μm or less or a size of 0.01 μm or more and 0.50 μm or less. The pores 25*a* may have any average size. The pores 25*a* may have an average size of 1.00 μm or less or an average size of 0.03 m or more and 0.45 μm or less.

The average size of the segregates 23*a* and 23*b* divided by the average size of the pores 25*a* may be 0.19 or more and 10.40 or less; more than 1.00 and 6.00 or less; or 1.70 or more and 5.33 or less.

In particular, with the average size of the segregates 23*a* and 23*b* divided by the average size of the pores 25*a* being more than 1.00 and 6.00 or less, the dielectric readily has an improved sinterability, an improved insulation resistance, and an improved durability. In particular, the dielectric readily has less cracks.

The segregates and the pores have a minimum size of 1.0 nm. In other words, portions having a size of less than 1.0 nm are not regarded as segregates or pores.

Grain sizes of the dielectric grains 21, sizes of the segregates 23*a* and 23*b*, and sizes of the pores 25*a* can be measured by an image analysis of a sectional photograph. Types of the sectional photograph are not limited. The sectional photograph may be a sectional photograph obtained with a STEM as described above or a sectional photograph obtained with a SEM, a TEM, or the like.

The grain sizes of the dielectric grains 21 mean equivalent circle diameters of the dielectric grains 21. The sizes of the segregates 23*a* and 23*b* mean equivalent circle diameters of the segregates 23*a* and 23*b*. The sizes of the pores 25*a* mean equivalent circle diameters of the pores 25*a*.

An equivalent circle diameter of a target is a diameter of a circle having the same area as the target.

The average grain size of the dielectric grains 21 can be calculated by measuring the equivalent circle diameters of at least five dielectric grains 21 and averaging the measurements. The average size of the segregates 23*a* and 23*b* can be calculated by measuring the equivalent circle diameters of at least five segregates 23*a* or 23*b* and averaging the measurements. The average size of the pores 25*a* can be calculated by measuring the equivalent circle diameters of at least five pores 25*a* and averaging the measurements.

In a set of the specific combination of the segregate 23*a* and the pore 25*a* in contact with each other, the pore 25*a* may have a size smaller than that of the segregate 23*a*.

The dielectric grains 21 may have any composition. The dielectric grains 21 may contain, as a main component, a component containing Ca, Sr, and/or Ba. The dielectric grains 21 may contain, as a main component, a perovskite-type compound represented by a general formula $ABO_3$. Examples of perovskite-type compounds include barium titanate, calcium titanate, strontium titanate, calcium zirconate, strontium zirconate, and calcium strontium zirconate. The dielectric grains 21 may contain, as a main component, barium titanate.

The dielectric grains 21 may contain, as a main component, a component represented by a composition formula $[(Ca_xSr_{1-x})O]_n[(Ti_yZr_{1-y})O_2]$. Note that the composition ratio is in terms of atomicity.

In the composition formula, "n" denotes a ratio of the A-site to the B-site; and "n" may be 1.0 or more and 1.2 or less.

In the composition formula, "x" denotes a ratio of Ca to the A-site; and "x" may be 0 or more and 1 or less.

In the composition formula, "y" denotes a ratio of Ti to the B-site; and "y" may be 0 or more and 0.3 or less.

An element ratio of oxygen (O) in the composition formula may slightly deviate from the stoichiometric composition.

The main component of the dielectric grains is a component constituting 95 mol % or more of the dielectric grains as a whole.

The segregates may have any composition. An element that the segregates contain the most in terms of atomicity other than O, Ca, Sr, Zr, and Ti may be Si. With the segregates being rich in Si, the dielectric readily has an improved sinterability. Further, the dielectric readily has an improved insulation resistance and an improved durability.

Out of 100% of the total area of the segregates in a section, the percentage of the total area of the segregates containing Si the most in terms of atomicity other than O, Ca, Sr, Zr, and Ti may be 25% or more.

The segregates may contain, as a main component, a Ca—Sr—Mn—Si based component. The Ca—Sr—Mn—Si based component may be an oxide. This component functions as a sintering aid.

The main component of the segregates is a component constituting 80 mol % or more of the segregates as a whole.

The Ca—Sr—Mn—Si based component is a component in which Ca, Sr, Mn, and Si each constitute 3 mol % or more out of a total of 100 mol % of all elements other than O.

In the Ca—Sr—Mn—Si based component, the Ca content may be 20 mol % or more and 60 mol % or less out of a total of 100 mol % of all elements other than O. The Sr content may be 10 mol % or more and 30 mol % or less. The Mn content may be 3 mol % or more and 12 mol % or less. The Si content may be 15 mol % or more and 45 mol % or less.

The dielectric constituting the ceramic layers 10 may include segregates other than the segregates containing the Ca—Sr—Mn—Si based component as a main component. Out of 100% of the total area of the segregates in a section, the percentage of the total area of the segregates containing the Ca—Sr—Mn—Si based component as a main component may be 50% or more.

The segregates 23*a* and 23*b* may have a linear expansion coefficient smaller than that of the dielectric grains 21.

Figure 3:
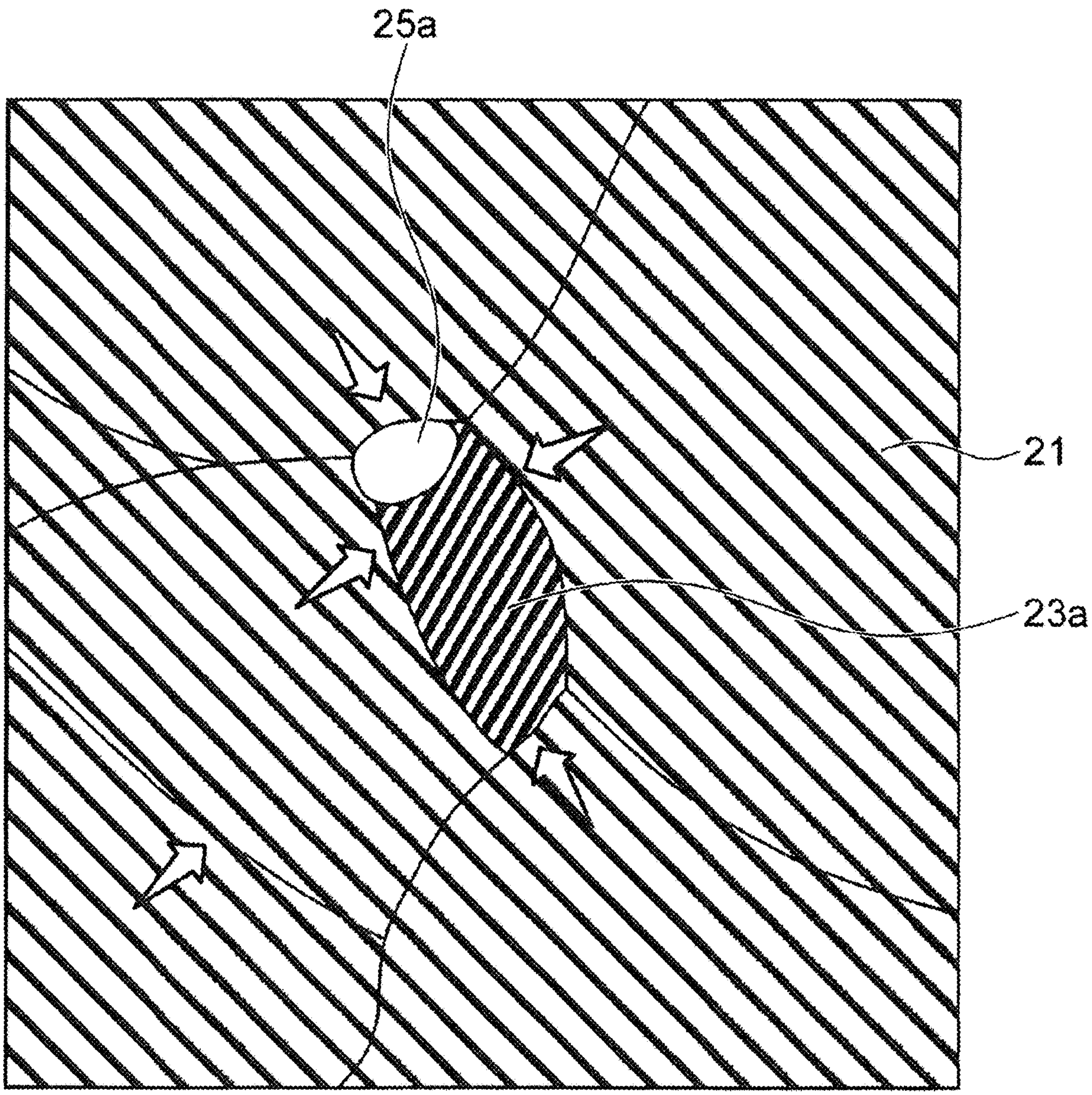
FIG. 3 is a sectional schematic view of a dielectric.
Figure 4:
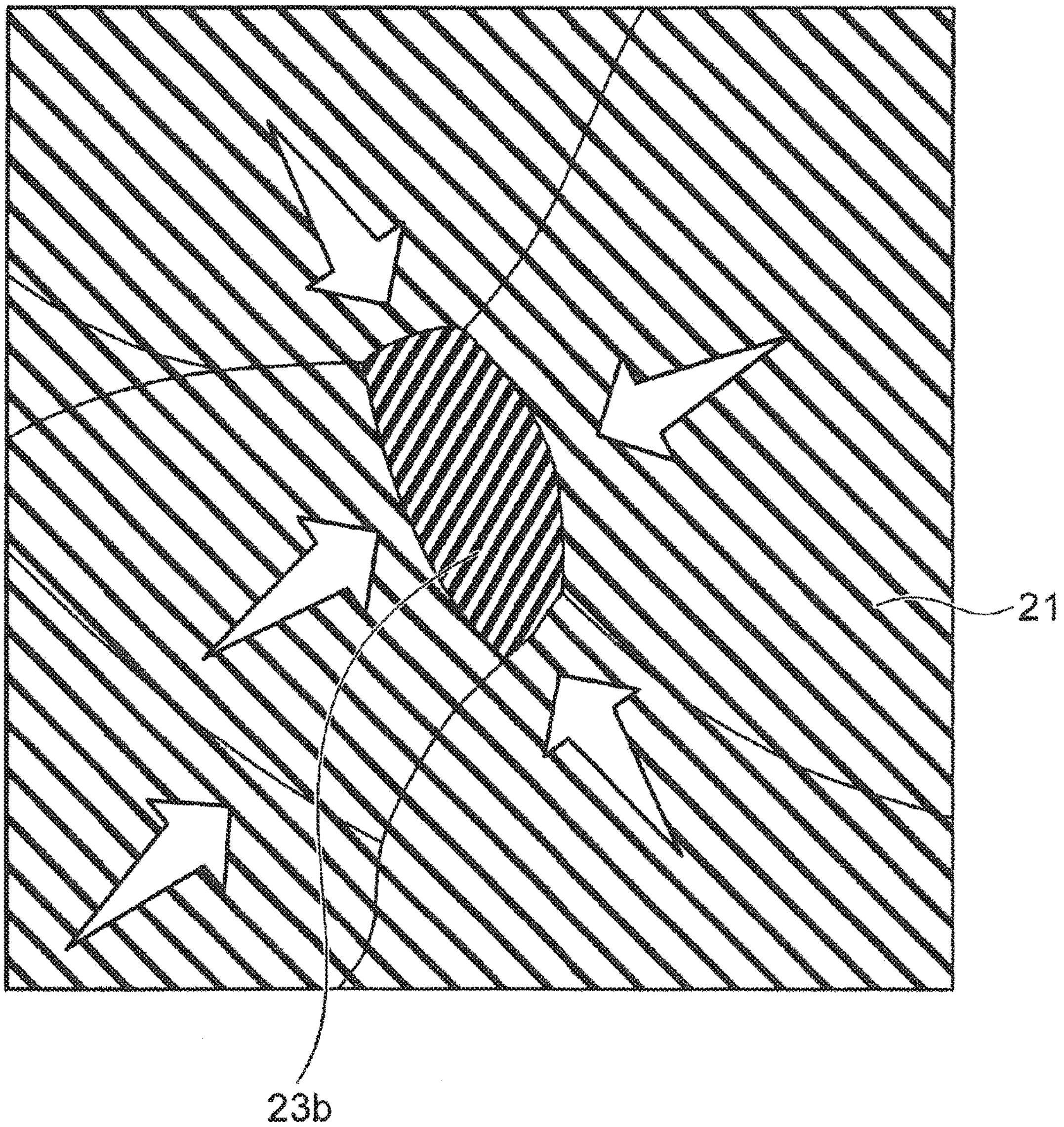
FIG. 4 CONVENTIONAL ART
FIG. 4 is a sectional schematic view of a dielectric.

FIG. 3 is a schematic view of a dielectric having the specific combination. FIG. 4 is a schematic view of a dielectric that does not have the specific combination.

In general, if a dielectric including dielectric grains and segregates has a portion with a relatively large linear expansion coefficient, stress is applied from the portion with the large linear expansion coefficient to a portion with a small linear expansion coefficient. Thus, cracks may be generated in the dielectric.

For a dielectric to be sintered at a low temperature, a sintering aid needs to be added to reduce the sintering temperature. However, addition of the sintering aid generates segregates with a small linear expansion coefficient.

In this situation, compressive stress is applied from dielectric grains 21 to a segregate 23*b* (not forming the specific combination), as shown in FIG. 4. The orientation of an arrow denotes the orientation of the stress, and the size of the arrow denotes the magnitude of the stress. Due to the compressive stress, cracks are readily generated in the dielectric.

By contrast, with a pore 25*a* being provided adjacent to a segregate 23*a* so that a dielectric has the specific combination of the segregate 23*a* and the pore 25*a* as shown in FIG. 3, compressive stress is mitigated. Consequently, the dielectric is readily sintered at a low temperature and readily has less cracks.

Now, an example method of manufacturing the multilayer ceramic capacitor 2 shown in FIG. 1 is described.

First, a process of manufacturing the element body 4 is described. In the process of manufacturing the element body 4, a dielectric paste to be the ceramic layers 10 after firing and an internal electrode paste to be the internal electrode layers 12 after firing are prepared.

The dielectric paste is produced using a powder (dielectric powder) containing a component to be the dielectric grains after firing and a segregate powder containing a component to be the segregates after firing. The following description is provided on the premise that the dielectric powder is constituted by a perovskite-type compound and that the segregate powder is constituted by a Ca—Sr—Mn—Si based oxide. However, the composition of the dielectric powder and the composition of the segregate powder are not limited.

The dielectric powder can be produced using, for example, a solid phase method, a hydrothermal synthesis method, or a sol-gel method. For example, if the solid phase method is used, uniformly mixing starting raw materials (e.g., a $CaCO_3$ powder, a $SrCO_3$ powder, a BaO powder, a $ZrO_2$ powder, and a $TiO_2$ powder) using wet-mixing or the like and then performing a calcination treatment gives the dielectric powder constituted by a perovskite-type compound. At this time, the dielectric powder, which has been calcined, may appropriately be subject to treatments, such as pulverization or classification.

The segregate powder is produced by mixing a powder of a compound containing Ca (e.g., a $CaCO_3$ powder), a powder of a compound containing Sr (e.g., a $SrCO_3$ powder), a powder of a compound containing Mn (e.g., a $MnCO_3$ powder), and a powder of a compound containing Si (e.g., a $SiO_2$ powder) at a predetermined ratio and performing a calcination treatment. The composition of the segregates can be controlled by the mixing ratio of the powders of the compounds (starting raw materials). At the time of production of the segregate powder, a pulverization treatment or the like may be appropriately performed to control the sizes of the segregates. Note that, as the powders of the compounds, oxide powders, carbonate powders, nitrate powders, sulfate powders, or the like can be used; and powders of compounds that become oxides after firing are used.

Adding the dielectric powder and the segregate powder to an organic vehicle and kneading them gives the dielectric paste. The organic vehicle is a mixture of an organic solvent and a binder dissolved therein. The binder may be of any type. The binder is appropriately selected from known binders (e.g., polyvinyl butyral, acrylic, and ethyl cellulose). The organic solvent may be of any type. The organic solvent is appropriately selected from known organic solvents (e.g., methyl ethyl ketone, methanol, ethanol, acetone, toluene, terpineol, and butyl carbitol).

The dielectric paste is organic based paint. The dielectric paste may be water-based paint in which a mixture of the powders and a water-based vehicle are kneaded. The water-based vehicle is produced by dissolving a water-soluble binder, dispersant, or the like in water. The water-soluble binder may be of any type. The water-soluble binder is appropriately selected from known water-soluble binders (e.g., polyvinyl alcohol, water-soluble acrylic resin, and water-soluble polyvinyl butyral resin).

Adjusting the mixing ratio of the dielectric powder to the segregate powder of the dielectric paste can control the percentage of the segregates in the ceramic layers 10 eventually obtained. The dielectric paste may contain, as necessary, an additive selected from various dispersants, plasticizers, dielectrics (other than the perovskite-type compound), glass frit, etc.

The internal electrode paste is produced by kneading a conductive material (e.g., a pure Ni powder or a Ni alloy powder), an organic metal compound, a resinate, and the like with an organic vehicle mentioned above. Instead of the conductive material, various oxides that become Ni or the Ni alloy mentioned above after firing may be used. Further, the dielectric powder included in the dielectric paste may be added to the internal electrode paste as an inhibitor. The inhibitor prevents sintering of the conductive powder in a firing step.

Then, using a doctor blade method or the like, the dielectric paste is turned into sheets to give ceramic green sheets. On the ceramic green sheets, the internal electrode paste is applied in predetermined patterns using a printing method (e.g., screen printing) or a transfer method. The resulting green sheets having the internal electrode patterns are laminated and are then pressed in the lamination direction to give a mother laminated body. At this time, the ceramic green sheets and the internal electrode patterns are laminated so that the ceramic green sheets are located on the upper and lower surfaces of the mother laminated body in the lamination direction.

The mother laminated body resulting as above is cut into predetermined dimensions by dicing or push-cutting to give green chips. The green chips may be subject to solidification drying to remove plasticizers or the like as necessary.

The green chips may be subject to barrel polishing using a horizontal centrifugal barrel machine or the like. If the green chips are subject to solidification drying, they may be subject to barrel polishing after solidification drying.

In barrel polishing, the green chips are put into a barrel together with media and a polishing liquid. A rotational movement or vibration is applied to the barrel to perform barrel polishing of the green chips. By barrel polishing, unwanted parts (e.g., burrs generated during cutting) are removed, and the corners of the green chips are rounded. The green chips after barrel polishing are washed with a cleaning solution (e.g., water) and dried. This barrel polishing may be performed after firing (described later) of the green chips.

Then, each of the green chips resulting as above is subject to a binder removal treatment and a firing treatment to give the element body 4.

Conditions of the binder removal treatment are appropriately determined according to, for example, the composition of the dielectric grains, the composition of the segregates, and the composition of the internal electrode layers. For example, the heating rate may be 5 to 300° C./hour; the holding temperature may be 180 to 400° C.; and the holding time may be 0.5 to 24 hours. The binder removal atmosphere is air or a reducing atmosphere.

Conditions of the firing treatment are appropriately determined according to, for example, the composition of the dielectric grains, the composition of the segregates, and the composition of the internal electrode layers. For example, the holding temperature during firing may be 1200 to 1350° C. or 1220 to 1300° C. The holding time may be 0.5 to 8 hours or 1 to 3 hours. The firing atmosphere may be a reducing atmosphere. As an ambient gas, for example, a humidified mixed gas of $N_2$ and $H_2$ may be used. Further, if the internal electrode layers are constituted by a base metal (e.g., Ni or a Ni alloy), the oxygen partial pressure in the firing atmosphere may be $1.0\times10^{-14}$ to $1.0\times10^{-1}$ MPa.

After the firing treatment, an annealing treatment may be performed as necessary. The annealing treatment is a treatment for reoxidizing the dielectric in the ceramic layers. If the firing treatment has been performed in the reducing atmosphere, the annealing treatment is preferably performed. Conditions of the annealing treatment are appropriately determined according to, for example, the composition of the dielectric grains, the composition of the segregates, and the composition of the internal electrode layers. For example, the holding temperature may be 650 to 1150° C. The holding time may be 0 to 20 hours. The heating rate and the cooling rate may be 50 to 500° C./hour. As an ambient gas, for example, a dried $N_2$ gas or a humidified $N_2$ gas may be used. The annealing treatment may be performed multiple times.

To humidify the $N_2$ gas, the mixed gas, or the like in the binder removal treatment, the firing treatment, and the annealing treatment, for example, a wetter is used. If a wetter is used, the water temperature may be approximately 5 to 75° C. The binder removal treatment, the firing treatment, and the annealing treatment may be performed consecutively or independently.

In each of the above heat treatments (binder removal treatment, firing treatment, and annealing treatment (reoxidation treatment)), the green chips are heated on a refractory setter plate. Then, after the heat treatment, each element body 4 having been fired is dropped from the setter plate and is collected.

Then, on the outer surfaces of the resulting element body 4, the pair of external electrodes 6 is formed. The external electrodes 6 may be formed by any method. For example, to form baked electrodes as the external electrodes 6, a conductive paste including glass frit is applied to the end surfaces of the element body 4 by a dip method, and then the element body 4 is heated at a predetermined temperature. To form resin electrodes as the external electrodes 6, a conductive paste including a thermosetting resin is applied to the end surfaces of the element body 4, and then the element body 4 is heated at a temperature at which the thermosetting resin cures. Further, after the baked electrodes or the resin electrodes are formed by the above methods, electrolytic plating, electroless plating, sputtering, vapor deposition, or the like may be performed to give the external electrodes 6 having a multilayer structure.

The above processes give the multilayer ceramic capacitor 2 including the external electrodes 6.

Three methods of producing the ceramic layers 10 including the dielectric having the specific combination are described below. Methods of producing the ceramic layers 10 including the dielectric having the specific combination are not limited to the following three methods.

(First Method of Production)

After the segregate powder is produced and before the dielectric powder and the segregate powder are kneaded, resin is adhered to the segregate powder. The resin may be of any type that does not dissolve in an organic solvent or is difficult to dissolve in an organic solvent. Examples of the resin adhered to the segregate powder include polyvinyl alcohol (PVA). PVA is a water-soluble resin, and PVA is a resin that does not dissolve in an organic solvent.

The amount of the adhered resin is not limited. With respect to 100 parts by mass of the segregate powder, the amount of the resin may be 10 parts by mass or more and 100 parts by mass or less.

Processes after the resin is adhered to the segregate powder are as described above. The resin adhered to the segregate powder disappears to generate pores during firing to form the specific combination.

(Second Method of Production)

After the segregate powder is produced and before the dielectric powder and the segregate powder are kneaded, the segregate powder is mixed with a carbon powder. The amount of the carbon powder is not limited. With respect to 100 parts by mass of the segregate powder, the amount of the carbon powder may be 10 parts by mass or more and 100 parts by mass or less.

Processes after the segregate powder and the carbon powder are mixed are as described above. The carbon powder disappears to generate pores during firing to form the specific combination.

(Third Method of Production)

At the time of producing the segregate powder, a spray dryer is used. Using the spray dryer to produce the segregate powder enables at least a part of the segregate powder to have hollow portions.

Processes after the segregate powder having the hollow portions is produced are as described above. The hollow portions become pores during firing to form the specific combination.

Although an embodiment of the present invention has been described above, the present invention is not limited to the above embodiment and can be variously modified without departing from the gist of the present invention.

The multilayer ceramic capacitor 2 exemplifies a multilayer electronic device of the present embodiment. However, the multilayer electronic device of the present invention may be, for example, a bandpass filter, a multilayer three-terminal filter, a thermistor, or a varistor.

In the present embodiment, the ceramic layers 10 and the internal electrode layers 12 are laminated in the Z-axis direction. However, the ceramic layers 10 and the internal electrode layers 12 may be laminated in the X-axis direction or the Y-axis direction. In such a situation, the external electrodes 6 are formed on surfaces to which the internal electrode layers 12 are exposed. The internal electrode layers 12 may be drawn out to outer surfaces of the element body 4 via through-hole electrodes. In such a situation, the through-hole electrodes and the external electrodes 6 are electrically connected.

EXAMPLES

Hereinafter, the present invention is described based on more detailed examples. However, the present invention is not limited to these examples.

Experiment 1

Capacitor samples shown in Table 1 (shown later) were manufactured using the following procedure.

First, a dielectric powder and a segregate powder (raw materials of a dielectric paste) were prepared.

Using a solid phase method, a $(Ca_{0.70}Sr_{0.30})(Zr_{0.96}Ti_{0.04})O_3$ powder was produced. The $(Ca_{0.70}Sr_{0.30})(Zr_{0.96}Ti_{0.04})O_3$ powder is hereinafter referred to as a powder A.

In Experiment 1, the powder A was used as the dielectric powder. The above composition was in atomic ratio (in terms of atomicity). The composition of the powder A was common to all Examples and Comparative Examples. However, the particle size of the powder A was controlled so that dielectric grains in a dielectric eventually obtained had an average grain size shown in Table 1.

A $CaCO_3$ powder, a $SrCO_3$ powder, a $MnCO_3$ powder, and a $SiO_2$ powder were wet-mixed at a predetermined ratio and were calcined. Then, the calcined mixture was pulverized using a ball mill to give the segregate powder. In Experiment 1, a powder constituted by a Ca—Sr—Mn—Si based oxide was used as the segregate powder. The segregate powder had a particle size such that an average size ratio described later was as shown in Table 1.

An element that segregates in the dielectric eventually obtained contained the most in terms of atomicity other than O, Ca, Sr, Zr, and Ti was as shown in Table 1. Note that the segregate powder used for manufacture of the capacitor samples had the same composition except for Sample Nos. 14 and 15.

The segregate powder used for manufacture of the capacitor samples other than Sample Nos. 14 and 15 was produced so that the ratio of the $CaCO_3$ powder, the $SrCO_3$ powder, the $MnCO_3$ powder, and the $SiO_2$ powder satisfied a molar ratio of Ca:Sr:Mn:Si=0.86:0.57:0.57:1.00. The segregate powder used for manufacture of Sample No. 14 was produced so that the ratio of the $MnCO_3$ powder and a $MgCO_3$ powder satisfied a molar ratio of Mn:Mg=0.40:0.60. The segregate powder used for manufacture of Sample No. 15 was produced so that the ratio of the $CaCO_3$ powder, the $SrCO_3$ powder, an $Al_2O_3$ powder, and the $SiO_2$ powder satisfied a molar ratio of Ca:Sr:Al:Si=1.6:0.4:2.0:1.0.

Then, 35.75 parts by mass dielectric powder, 0.50 parts by mass segregate powder, 0.25 parts by mass PVA, and 63.50 parts by mass organic vehicle were kneaded to give the dielectric paste.

Separately, 50.63 parts by mass Ni powder, 10.12 parts by mass dielectric powder, and 39.25 parts by mass organic vehicle were kneaded to give an internal electrode paste.

As the above-mentioned organic vehicle, ethyl cellulose was used.

Then, using the dielectric paste and the internal electrode paste, green chips were manufactured by a sheet method. The green chips were then subject to a binder removal treatment, a firing treatment, and an annealing treatment to give element bodies 4 (capacitor samples) having a dimension of L0×W0×T0=3.2 mm×2.5 mm×2.5 mm. In each element body 4, the number of ceramic layers 10 interposed between internal electrode layers 12 was 150. The ceramic layers 10 had an average thickness of 12 m. The internal electrode layers 12 had an average thickness of 1.4 m.

The binder removal treatment was performed at 260° C. for 8 hours. The firing treatment was performed at 1240° C. for 2 hours. The annealing treatment was performed at 750° C. for 2 hours.

For Sample No. 1, neither the segregate powder nor PVA was used. For Sample No. 2, PVA was not used. For Sample No. 3, the segregate powder was not used. For Sample No. 4, PVA was added after the dielectric powder, the segregate powder, and the organic vehicle were mixed. For Sample Nos. 5 to 19, PVA was partly or entirely adhered to the segregate powder before the dielectric powder, the segregate powder, and the organic vehicle were mixed, and further PVA that did not adhere to the segregate powder was added. Note that, to control the number ratio of the specific combination as shown in Table 1, the ratio of the amount of PVA adhered to the segregate powder to the amount of PVA that did not adhere to the segregate powder was controlled.

The following evaluation was conducted for the capacitor samples of Experiment 1.

Segregate phases in the ceramic layers were analyzed using STEM-EDS.

First, by a microsampling method using a focused ion beam (FIB) (JIB-4700F manufactured by JEOL Ltd.), a thin specimen was collected from the ceramic layers 10 in the vicinity of a center of the element body. Specifically, the ceramic layers 10 were roughly shaved at 30 kV-0.3 nA and were then processed into the thin specimen having a size of approximately 12 μm×10 μm×100 nm at 30 kV-100 pA. Sectional cleaning was performed at 5 kV-70 pA.

Then, a section of the thin specimen was observed using STEM-EDS (JEM-2200FS (HR) manufactured by JEOL Ltd.). Resulting STEM-DF images were observed at a magnification of 50,000× and at an accelerating voltage of 200 kV. Elemental mapping was performed at a process time of PHA (pulse height analyzer) of T2; a count rate of approximately 15,000 to 25,000 cps; a live time of approximately 1,500 seconds; a number of pixels of 256×256; and a sweep count of 200.

Field of views of the STEM images had a size of 10 μm×10 μm per site, and four different sites were observed. Using the STEM-DF images of the four sites and elemental mapping, whether the dielectric included the segregates, whether the dielectric had pores, and whether the dielectric had the specific combination were confirmed; and the number ratio of the specific combination was calculated. Also, an element (a richest segregate element) that the segregates contained the most in terms of atomicity other than O, Ca, Sr, Zr, and Ti was confirmed.

When it was difficult to determine whether a segregate and a pore were in contact with each other, their surroundings were enlarged so that the field of view of interest had a size of 2 μm×2 μm for determination. If the segregate and the pore were in contact with each other by 1 dot, they were deemed to be in contact with each other. If the segregate and the pore were not in contact even by 1 dot, they were deemed to be not in contact with each other.

The average size of the segregates and the average size of the pores were calculated, and the average size of the segregates was divided by the average size of the pores to calculate the average size ratio. Further, the average grain size of the dielectric grains (dielectric grain size) was calculated.

In all Examples and Comparative Examples, it was confirmed that the pores of the specific combination had a size smaller than that of the segregates of the specific combination.

Regarding specific resistance (IR), insulation resistance of the capacitor samples was measured using a digital resistance meter (R8340 manufactured by ADVANTEST CORPORATION) at a reference temperature (25° C.). Specific resistance (IR) was calculated from the measured insulation resistance, the effective electrode area, and the thickness of the dielectric. Table 1 shows the results. IR of $1.00\times10^{11}\Omega$ or more was defined as good. IR of $1.00\times10^{13}\Omega$ or more was defined as better. IR of Sample No. 5 is shown as "1.82E+13" in Table 1. This means "$1.82\times10^{13}$".

In Experiment 1, for the capacitor samples having a specific resistance of less than $1.00\times10^{11}\Omega$, evaluation of crack incidence was not conducted.

Crack incidence was evaluated for the capacitor samples having a specific resistance of $1.00\times10^{11}\Omega$ or more. First, one hundred capacitor samples for crack incidence evaluation were manufactured for each Sample Number. Then, whether the dielectric of the manufactured capacitor samples had cracks was confirmed. Then, the capacitor samples were subject to a pressure cooker test (PCT). PCT was conducted at 121° C., 95% RH. Whether the dielectric of the capacitor samples after PCT for 24 hours had cracks was confirmed. Finally, PCT was further conducted for the capacitor samples after PCT for 24 hours so that the total time of PCT was 168 hours. Whether the dielectric of the capacitor samples after PCT for 168 hours in total had cracks was confirmed. Table 1 shows the results.

As for the capacitor samples prior to PCT, a crack incidence of 1% or less, i.e., the number of capacitor samples with cracks being one or less, was defined as good. As for the capacitor samples after PCT for 24 hours, a crack incidence of 10% or less, i.e., the number of capacitor samples with cracks being ten or less, was defined as good.

As for the capacitor samples after PCT for 168 hours, a crack incidence of 40% or less, i.e., the number of capacitor samples with cracks being forty or less, was defined as good.

For all of the capacitor samples prior to PCT, after PCT for 24 hours, and after PCT for 168 hours, a crack incidence of less than 1%, i.e., the number of capacitor samples with cracks being zero, was defined as better.

It was confirmed that, in all Examples and Comparative Examples, the segregates had a linear expansion coefficient smaller than that of the dielectric grains. First, a sintered body was produced using only the dielectric powder. The sintered body produced using only the dielectric powder had a composition similar to that of the dielectric grains. Separately, a sintered body having the same composition as the segregate phases was produced. Respective average linear expansion coefficients of the sintered bodies were measured and confirmed. Note that the respective average linear expansion coefficients of the sintered bodies were measured using a thermomechanical analysis (TMA) within a temperature range of room temperature to 1200° C.

TABLE 1

| Sample No. | Examples/ Comparative Examples | Dielectric powder | Segregates | Pores | Specific combination | Average size ratio | Number ratio of specific combination [per mm$^2$] |
|---|---|---|---|---|---|---|---|
| 1 | Comparative Example | Powder A | Not included | Not included | Absent | N/A | 0.0E+00 |
| 2 | Comparative Example | Powder A | Included | Not included | Absent | N/A | 0.0E+00 |
| 3 | Comparative Example | Powder A | Not included | Included | Absent | N/A | 0.0E+00 |
| 4 | Comparative Example | Powder A | Included | Included | Absent | 3.17 | 0.0E+00 |
| 5 | Example | Powder A | Included | Included | Present | 3.57 | 2.1E+05 |
| 6 | Example | Powder A | Included | Included | Present | 0.19 | 2.9E+05 |
| 7 | Example | Powder A | Included | Included | Present | 1.70 | 4.5E+05 |
| 5 | Example | Powder A | Included | Included | Present | 3.57 | 2.1E+05 |
| 8 | Example | Powder A | Included | Included | Present | 5.33 | 4.0E+05 |
| 9 | Example | Powder A | Included | Included | Present | 10.40 | 3.6E+05 |
| 10 | Example | Powder A | Included | Included | Present | 3.39 | 1.2E+04 |
| 11 | Example | Powder A | Included | Included | Present | 3.82 | 2.8E+04 |
| 5 | Example | Powder A | Included | Included | Present | 3.57 | 2.1E+05 |
| 12 | Example | Powder A | Included | Included | Present | 3.36 | 1.5E+06 |
| 13 | Example | Powder A | Included | Included | Present | 3.02 | 3.9E+07 |
| 5 | Example | Powder A | Included | Included | Present | 3.57 | 2.1E+05 |
| 14 | Example | Powder A | Included | Included | Present | 3.60 | 4.2E+05 |
| 15 | Example | Powder A | Included | Included | Present | 3.76 | 1.4E+05 |
| 16 | Example | Powder A | Included | Included | Present | 3.44 | 1.7E+05 |
| 17 | Example | Powder A | Included | Included | Present | 3.93 | 5.4E+05 |
| 5 | Example | Powder A | Included | Included | Present | 3.57 | 2.1E+05 |
| 18 | Example | Powder A | Included | Included | Present | 3.28 | 1.1E+05 |
| 19 | Example | Powder A | Included | Included | Present | 3.66 | 1.9E+05 |

| Sample No. | Richest segregate element | Dielectric grain size [μm] | IR [Ω] | Crack incidence PCT 0 h | Crack incidence PCT 24 h | Crack incidence PCT 168 h |
|---|---|---|---|---|---|---|
| 1 | N/A | 1.74 | 2.81E+08 | Not conducted | Not conducted | Not conducted |
| 2 | Si | 1.48 | 7.99E+13 | 3/100 | 17/100 | 50/100 |
| 3 | N/A | 1.62 | 7.34E+08 | Not conducted | Not conducted | Not conducted |
| 4 | Si | 1.34 | 5.35E+13 | 3/100 | 27/100 | 49/100 |
| 5 | Si | 1.51 | 1.82E+13 | 0/100 | 0/100 | 0/100 |
| 6 | Si | 1.94 | 8.54E+12 | 0/100 | 8/100 | 23/100 |
| 7 | Si | 1.42 | 2.12E+13 | 0/100 | 0/100 | 0/100 |
| 5 | Si | 1.51 | 1.82E+13 | 0/100 | 0/100 | 0/100 |
| 8 | Si | 1.93 | 2.45E+13 | 0/100 | 0/100 | 0/100 |
| 9 | Si | 1.95 | 2.95E+13 | 0/100 | 9/100 | 19/100 |
| 10 | Si | 1.25 | 1.10E+13 | 0/100 | 3/100 | 21/100 |
| 11 | Si | 1.13 | 4.26E+13 | 0/100 | 0/100 | 0/100 |
| 5 | Si | 1.51 | 1.82E+13 | 0/100 | 0/100 | 0/100 |
| 12 | Si | 1.28 | 5.00E+13 | 0/100 | 0/100 | 0/100 |
| 13 | Si | 1.42 | 9.82E+12 | 0/100 | 7/100 | 25/100 |
| 5 | Si | 1.51 | 1.82E+13 | 0/100 | 0/100 | 0/100 |
| 14 | Mn | 1.31 | 2.25E+12 | 0/100 | 0/100 | 5/100 |
| 15 | Al | 1.56 | 1.18E+12 | 0/100 | 0/100 | 7/100 |
| 16 | Si | 0.051 | 3.38E+13 | 0/100 | 0/100 | 18/100 |
| 17 | Si | 0.19 | 2.88E+13 | 0/100 | 0/100 | 0/100 |
| 5 | Si | 1.51 | 1.82E+13 | 0/100 | 0/100 | 0/100 |
| 18 | Si | 2.65 | 2.36E+13 | 0/100 | 0/100 | 0/100 |
| 19 | Si | 5.27 | 5.92E+13 | 0/100 | 0/100 | 20/100 |

According to Table 1, the capacitor samples of the Sample Numbers including the dielectric having the specific combination had high specific resistance (IR). Such capacitor samples readily had significantly less cracks than the capacitor samples of Sample Nos. 2 and 4 including the dielectric having at least the same specific resistance (IR) but not having the specific combination.

Experiment 2

Experiment 2 (Sample Nos. 20 to 24) was conducted as in Sample Nos. 5 and 16 to 19 of Experiment 1 except that barium titanate (a powder B) was used as the dielectric powder. Tables 2 and 3 show the results. Note that, because IR varied significantly when the powder B was used compared to a situation in which the powder A was used, Tables 2 and 3 do not show IR. However, it was confirmed that Sample Nos. 20 to 24 had approximately the same IR.

TABLE 2

| Sample No. | Examples/ Comparative Examples | Dielectric powder | Segregates | Pores | Specific combination | Average size ratio | Number ratio of specific combination [per mm$^2$] | Richest segregate element | Dielectric grain size [μm] | Crack incidence PCT 0 h | Crack incidence PCT 24 h | Crack incidence PCT 168 h |
|---|---|---|---|---|---|---|---|---|---|---|---|---|
| 5 | Example | Powder A | Included | Included | Present | 3.57 | 2.1E+05 | Si | 1.51 | 0/100 | 0/100 | 0/100 |
| 20 | Example | Powder B | Included | Included | Present | 3.90 | 2.2E+05 | Si | 1.82 | 0/100 | 0/100 | 0/100 |

TABLE 3

| Sample No. | Examples/ Comparative Examples | Dielectric powder | Segregates | Pores | Specific combination | Average size ratio | Number ratio of specific combination [per mm$^2$] | Richest segregate element | Dielectric grain size [μm] | Crack incidence PCT 0 h | Crack incidence PCT 24 h | Crack incidence PCT 168 h |
|---|---|---|---|---|---|---|---|---|---|---|---|---|
| 21 | Example | Powder B | Included | Included | Present | 3.04 | 1.4E+05 | Si | 0.054 | 0/100 | 0/100 | 21/100 |
| 22 | Example | Powder B | Included | Included | Present | 3.29 | 6.1E+05 | Si | 0.15 | 0/100 | 0/100 | 0/100 |
| 20 | Example | Powder B | Included | Included | Present | 3.90 | 2.2E+05 | Si | 1.82 | 0/100 | 0/100 | 0/100 |
| 23 | Example | Powder B | Included | Included | Present | 3.16 | 4.2E+05 | Si | 2.69 | 0/100 | 0/100 | 0/100 |
| 24 | Example | Powder B | Included | Included | Present | 3.64 | 1.2E+06 | Si | 5.67 | 0/100 | 0/100 | 17/100 |

According to Tables 2 and 3, the capacitor samples including the dielectric having the specific combination readily had significantly less cracks, even with a varied composition of the dielectric powder, i.e., a varied composition of the dielectric grains.

2 . . . multilayer ceramic capacitor
4 . . . element body
**4*a*** . . . end surface
**4*b*** . . . side surface
10 . . . ceramic layer
12 . . . internal electrode layer
21 . . . dielectric grain
**23*a*** . . . segregate (of specific combination)
**23*b*** . . . segregate (not of specific combination)
**25*a*** . . . pore (of specific combination)

What is claimed is:

1. A dielectric comprising:
a dielectric grain;
a segregate; and
a pore,
wherein the segregate and the pore are in contact to form a specific combination in a section of the dielectric, and
the pore of the specific combination has a size smaller than that of the segregate of the specific combination.

2. The dielectric according to claim 1, wherein an average size of the segregate divided by an average size of the pore is more than 1.00 and 6.00 or less.

3. The dielectric according to claim 1, wherein a number ratio of the specific combination in the section of the dielectric is $2.0\times10^4$ or more and $5.0\times10^6$ or less per mm$^2$.

4. The dielectric according to claim 1, wherein the segregate has a linear expansion coefficient smaller than that of the dielectric grain.

5. The dielectric according to claim 1, wherein an element that the segregate comprises the most in terms of atomicity other than O, Ca, Sr, Zr, and Ti is Si.

6. The dielectric according to claim 1, wherein the dielectric grain has a grain size of 0.10 μm or more and 3.00 μm or less.

7. The dielectric according to claim 1, wherein the dielectric grain comprises a component represented by a composition formula $[(CaxSr_{1-x})O]_n[(Ti_yZr_{1-y})O_2]$.

8. The dielectric according to claim 1, wherein the dielectric grain comprises barium titanate.

9. A multilayer electronic device comprising the dielectric according to claim 1.

10. A dielectric comprising:
a dielectric grain;
a segregate; and
a pore, wherein:
the segregate and the pore are in contact to form a specific combination in a section of the dielectric, and
an average size of the segregate divided by an average size of the pore is more than 1.00 and 6.00 or less.

11. The dielectric according to claim 10, wherein a number ratio of the specific combination in the section of the dielectric is $2.0\times10_4$ or more and $5.0\times10_6$ or less per mm$^2$.

12. The dielectric according to claim 10, wherein the segregate has a linear expansion coefficient smaller than that of the dielectric grain.

13. The dielectric according to claim 10, wherein an element that the segregate comprises the most in terms of atomicity other than O, Ca, Sr, Zr, and Ti is Si.

14. The dielectric according to claim 10, wherein the dielectric grain has a grain size of 0.10 μm or more and 3.00 μm or less.

15. A dielectric comprising:

a dielectric grain;

a segregate; and a pore, wherein:

the segregate and the pore are in contact to form a specific combination in a section of the dielectric, and a number ratio of the specific combination in the section of the dielectric is $2.0\times10^4$ or more and $5.0\times10^6$ or less per $mm^2$.

16. The dielectric according to claim 15, wherein the pore of the specific combination has a size smaller than that of the segregate of the specific combination, and an average size of the segregate divided by an average size of the pore is more than 1.00 and 6.00 or less.

17. The dielectric according to claim 15, wherein the segregate has a linear expansion coefficient smaller than that of the dielectric grain.

18. The dielectric according to claim 15, wherein an element that the segregate comprises the most in terms of atomicity other than O, Ca, Sr, Zr, and Ti is Si.

19. The dielectric according to claim 15, wherein the dielectric grain has a grain size of 0.10 μm or more and 3.00 μm or less.

* * * * *